Dec. 17, 1968     A. G. BODINE, JR     3,416,398
SONIC CUTTING APPARATUS
Filed July 5, 1966     2 Sheets-Sheet 1
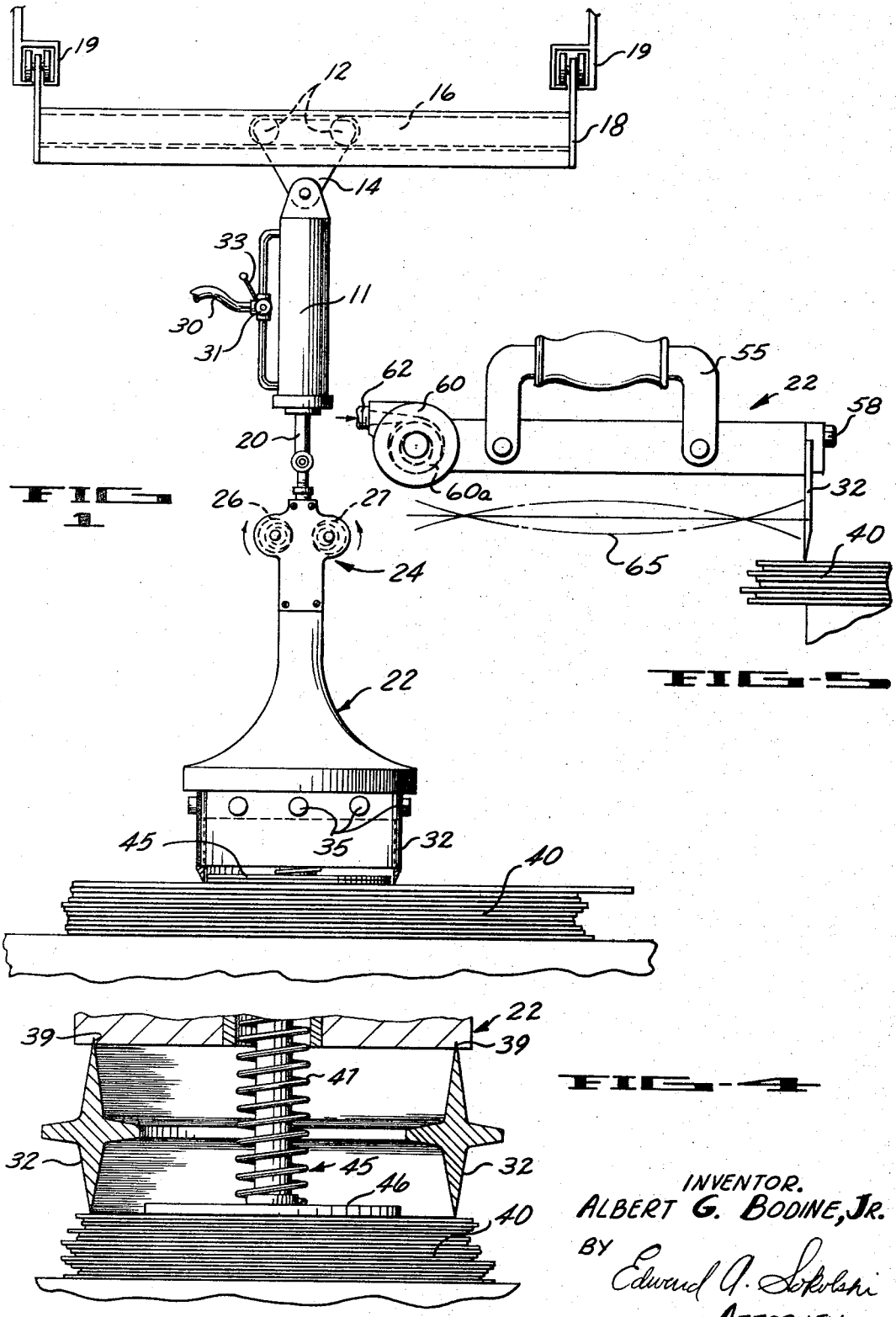
INVENTOR.
ALBERT G. BODINE, JR.
BY
Edward A. Sokolski
ATTORNEY

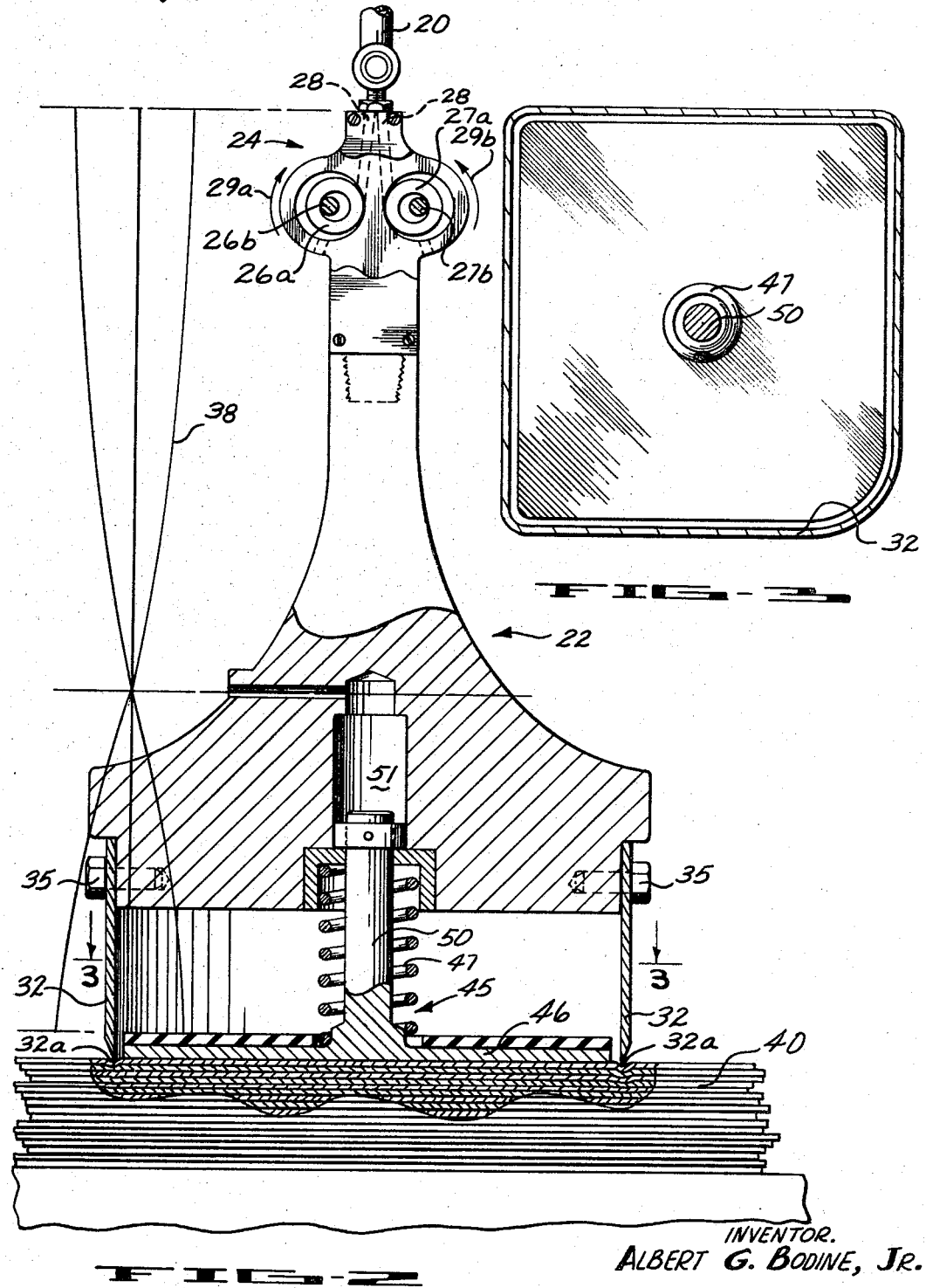

United States Patent Office 3,416,398
Patented Dec. 17, 1968

3,416,398
SONIC CUTTING APPARATUS
Albert G. Bodine, Jr., 7877 Woodley Ave.,
Van Nuys, Calif. 91406
Filed July 5, 1966, Ser. No. 562,579
5 Claims. (Cl. 83—523)

ABSTRACT OF THE DISCLOSURE

A cutting blade comprising a shaped die cutting edge engages material to be cut. An elastic resonator member is resonantly vibrated by means of an orbiting mass oscillator, the sonic energy being transferred to the cutting edge, thereby enabling the blade to sever the material.

---

This invention relates to a sonic cutting method and apparatus and more particularly to such a method and apparatus suitable for efficiently severing fibrous material by means of resonant vibratory energy.

Fibrous material such as, for example, fabric, leather, cardboard, and the like, is generally cut in mass production operations by means of a die cutter which is punched into the material under fairly high amounts of pressure. In this type of punching operation, the material tends to bunch up under the sustained bias force to which it is subjected, making the cutting operation, especially where multiple layers are involved, somewhat difficult of accomplishment. Oftentimes, too, the bottom layers of the material are so compacted by the bias forces imposed on the work piece during the cutting operation that their dimensions tend to differ appreciably from the top layers. Further, the compaction of the material by the cutting die tends to "harden" the work piece which not only makes the cutting operation more difficult but also greatly shortens blade life.

The method and devices of this invention overcome the shortcomings of prior art techniques for cutting fibrous material by utilizing resonant sonic energy to perform the cutting work in lieu of the application of a large bias force to the cutting blade. This avoids any compaction of the work piece, even where a great number of layers are involved, but rather effectively "releases" the material during each sonic vibratory cycle so that it is impossible for any sonic bias forces to build up. The avoidance of any compaction of the work piece in the method and devices of this invention assures a uniform dimension for both the bottom and top portions of such work piece and greatly helps to increase the life of the cutting blade. Further, the fibers of the work piece, which are oriented randomly, tend to experience a random motion relative to the resonantly vibrating cutting blade which results in such fibers being cut singularly rather than in a compacted form, making for a highly efficient slicing type cutting action.

The improvement is achieved in the method and devices of this invention by elastically vibrating a resonator member by means of a sonic oscillator. The sonic vibratory energy is transferred from the elastic resonator to a cutting blade which engages the material to be cut and slices therethrough by virtue of the sonic vibratory energy present at the blade edge.

It is therefore an object of this invention to provide an improved method and devices for cutting fibrous material.

It is a further object of this invention to increase the blade life of cutting devices used in cutting fibrous material.

It is still another object of this invention to provide means for obtaining greater uniformity in patterns cut in fibrous material in die cutting operations.

It is still a further object of this invention to provide means for employing sonic energy to facilitate the cutting of fibrous material.

Other objects of this invention will become apparent from the following description taken in connection with the accompanying drawings, of which FIG. 1 is an elevation view illustrating the operation of a first embodiment of the device of the invention, FIG. 2 is an elevation view, partially in cross section, illustrating the details of the cutting and resonator mechanism of the embodiment of FIG. 1, FIG. 3 is a cross sectional view taken along the plane indicated by 3—3 in FIG. 2, FIG. 4 is a cross sectional view in elevation illustrating a cutter mechanism of a second embodiment of the device of the invention, and FIG. 5 is an elevation view illustrating a third embodiment of the device of the invention.

It has been found most helpful in analyzing the operation of the device of the invention to analogize the acoustically vibrating circuit involved to an equivalent electrical circuit. This sort of approach to analysis is well known to those skilled in the art and is described, for example, in Chapter 2 of Sonics by Hueter and Bolt, published in 1955 by John Wiley and Sons. In making such an analogy, force, F, is equated with electrical voltage, E; velocity of vibration, $u$, is equated with electrical current, $i$; mechanical compliance, $C_m$, is equated with electrical capacitance, $C_e$; mass, M, is equated with electrical inductance, L; mechanical resistance (friction), $R_m$, is equated with electrical resistance, R; and mechanical impedance, $Z_m$, is equated with electrical impedance, $Z_e$.

Thus, it can be shown that if a member is elastically vibrated by means of an acoustical sinusoidal force, $F_o \sin \omega t$ ($\omega$ being equal to $2\pi$ times the frequency of vibration), that $$Z_m = R_m + j\left(\omega M - \frac{1}{\omega C_m}\right) = \frac{F_o \sin \omega t}{u}$$

Where $\omega m$ is equal to $1/\omega C_m$, a resonant condition exists, and the effective mechanical impedance, $Z_m$, is equal to the mechanical resistance, $R_m$, the reactive impedance components $\omega M$ and $1/\omega C_m$ cancelling each other out. Under such a resonant condition, velocity of vibration, $u$, is at a maximum, power factor is unity, and energy is most efficiently delivered to a load to which the resonant system may be coupled.

It is to be noted that in the device of this invention the mass and compliance for forming the resonantly vibrating system are furnished by the structural members of the cutting system themselves such that the material being cut is not incorporated in such system. The material being cut under such conditions acts as a friction load which provides no significant reactive components. This results in a random vibration of the particles of the material rather than a lumped coherent vibration, with a considerable relative motion between the separate material fibers or other structural elements thereof, as the case may be.

It is also to be noted that orbiting mass oscillators are preferably utilized in the devices of the invention that automatically adjust their output frequencies to maintain resonance with changes in the characteristics of the load. Thus, with changes in load characteristics as the cutting operation proceeds, the system automatically is maintained in optimum resonant operation by virtue of the "lock in" characteristics of applicant's orbiting mass oscillators. The vibrational outputs from such orbiting mass oscillators are generated along a controlled predetermined coherent path to provide maximum output along a desired axis or axes. The orbiting mass oscillators automatically change not only their frequency but also their phase angles and therefore their power factors with changes in the load to assure optimum efficiency of operation at all times. Such orbiting mass oscillators are capable of efficiently generating high level vibrational outputs.

It is further to be noted that as the sharpness of resonance of an electrical circuit is determined by the Q thereof (indicative of the ratio of energy stored to the energy used in each cycle) so also the Q of a mechanical resonant circuit has the same significance and is equal to the ratio between $\omega M$ and $R_m$. Thus, a high Q resonantly vibrating system is capable of producing considerable cyclic motion. In view of the fact that the acceleration of a sinusoidally vibrating mass is a function of the square of the frequency of vibration thereof, very high accelerations and thus forces can be developed even at moderately high resonant vibration frequencies. These factors are highly significant in making possible the efficient cutting action of the devices of this invention.

It should be kept in mind that the various qualities such as mass, compliance and resistance are seldomly lumped in a physical embodiment of a mechanical circuit but are rather distributed throughout the components thereof with most of such components exhibiting all three of these qualities to some degree.

Referring now to FIGS. 1–3, a first embodiment of the device of the invention is illustrated. Handle member 11 is suspended on rollers 12 by means of suspension carrier 14. Rollers 12 ride along track 16 which is supported on frame 18. Frame 18 is supported from an overhead structure (not shown) such as a ceiling beam, by means of brackets 19.

Connected to the end of handle member 11 by means of connecting tube 20 is elastic resonator member 22, which may be fabricated of an elastic metal. Mounted in the upper portion of resonator member 22 is orbiting mass oscillator 24. Orbiting mass oscillator 24 comprises a pair of oscillator units 26 and 27 which are of the type described in my Patent No. 2,960,314. As best shown in FIG. 2, these oscillator units each include a cylindrical rotor member 26a and 27a, which is rotatably driven about an associated post member 26b and 27b respectively. Such rotatable drive is provided by a pneumatic jet which is fed against the rim of each of the rotors through an associated pneumatic line 28. The jet is fed to lines 28 from a pneumatic source (not shown). Tube 20 is slidably mounted in handle 11 and is connected to a pneumatically driven piston (not shown) contained within the handle. This piston is controlled by means of lever 33 which controls the pneumatic drive to the piston which is supplied through line 30. A downward drive is thus provided for the cutter member.

Rotors 26a and 27a are driven, as indicated by arrows 29a and 29b resepctively, in opposite directions by the jet stream and are phased with respect to each other so as to produce vibrations along the longitudinal axis of resonator 22 while transverse vibrations cancel each other out. The vibratory outputs of oscillators 26 and 27 are transferred to resonator 22 and blade member 32 which is attached to the resonator, so as to set up standing waves 38 therealong. Blade member 32 has the shape of the desired pattern to be cut, as shown in FIG. 3, and may be attached to resonator 22 by means of bolts 35. Blade 32 is preferably made of a hard material such as saw steel, and has a sharp cutting edge 32a which slices through the material to be cut 40, with relative ease when resonant sonic energy is present in resonator 22. Oscillators 26 and 27 are made to rotate at a frequency in the sonic range (of the order of 100–1000 cycles per second) so as to cause resonant vibration of the vibration system including blade 32 and resonator 22.

The cutting action is aided by stirpper member 45 which is urged against the work piece 40 to be cut by spring 47 and thus holds the work piece in place. Stripper member 45 comprises flat plate 46 which is supported on a shaft 50 which in turn is slidably mounted in channel 51 formed in resonator member 22. As blade 32 penetrates into work piece 40, plate 46 is forced upwardly against the action of spring 47 and shaft 50 moves into channel 51.

Referring now to FIG. 4, the cutter mechanism of a second embodiment of the device of the invention is illustrated. This second embodiment utilizes a similar resonator and oscillator structure as the first embodiment, but differs in the blade structure of the cutting die. Cutting member 32 is supported in a groove 39 formed in resonator member 22 rather than being bolted thereto as in the previous embodiment. The work piece 40 is held in place by means of stripper member 45 which includes a flat plate 46 actuated by spring 47 in the same manner as described in connection with the previous embodiment. This alternative form of cutting blade provides a pair of cutting edges and is suitable for different types of die cutting operations than that shown and described in connection with the first embodiment. Otherwise, the operation of this second embodiment is the same as that described in connection with the first.

Referring now to FIG. 5, a third embodiment of the device of the invention in the form of a hand chopper is illustrated. In this embodiment, resonator member 22 has a handle 55 attached thereto, which is held by an operator in performing the cutting operation on work piece 40. Blade member 32 is in the form of a straight flat blade which is attached to resonator member 22 by means of bolt 58. Orbiting mass oscillator 60 is a single unit of the same type as described in connection with the previous embodiments and is pneumatically driven by a jet fed thereto through line 62. The rotor 60a of oscillator 60 is driven at a speed such as to set up resonant standing wave vibration in resonator member 22 and blade 32, as indicated by graph line 65. A portable sonic hand "chopper" is thus provided which is capable of slicing through fibrous material in the same efficient fashion as described in connection with the previous embodiments.

The device of this invention thus provides means for efficiently slicing through fibrous material by virtue of sonic energy. The devices and technique of this invention are suitable for cutting through material such as cardboard, plastic, leather, fabric, veneer, etc. The technique of this invention has the advantages of enabling closer control of the dimensions of the objects being cut as well as greatly facilitating the cutting operation. Further, wear on the cutting blade is greatly diminished, affording much greater life for such blades.

While the method and devices of this invention have been described and illustrated in detail, it is to be clearly understood that this is intended by way of illustration and example only and is not to be taken by way of limitation, the spirit and scope of this invention being limited only by the terms of the following claims.

I claim:
1. In a device for cutting material,
    a cutting blade engaging said material,
    an elastic resonator member, said blade being coupled to said resonator member, said blade comprising a shaped die cutting edge, said resonator member being coupled to the entire extent of said cuting edge so as to sonically activate said entire edge, and
    orbiting mass oscillator means connected to said resonator member for generating sonic vibrations at a frequency such as to cause resonant elastic vibration of said resonator member and said blade,
    whereby said blade is caused to sever said material by virtue of the sonic energy imparted thereto.

2. The device as recited in claim 1 and additionally including a stripper member for holding said material firmly in place, said stripper member comprising a flat plate, one of the broad surfaces of said plate abutting against said material, a shaft connected to said plate, said shaft being slidably mounted on said resonator member, and means for resiliently urging said plate against said material.

3. The device as recited in claim 1 and additionally including a handle member connected to said resonator member and means for movably suspending said handle member.

4. The device as recited in claim 1 wherein said orbiting mass oscillator means comprises a pair of oscillator units each having an eccentric rotor, said oscillator units being symmetrically arranged on opposite sides of the longitudinal axis of said resonator member, and means for rotatably driving said rotors in opposite directions.

5. The device as recited in claim 1 wherein said blade comprises a pair of similar oppositely positioned cutting edges, said resonator member having a groove formed therein for receiving one of said cutting edges.

References Cited
UNITED STATES PATENTS

| | | |
|---|---|---|
| 2,304,793 | 12/1942 | Bodine. |
| 2,384,435 | 9/1945 | Bodine. |
| 2,960,314 | 11/1960 | Bodine _____ 165—1 |
| 2,990,616 | 7/1961 | Balamuth et al. |

WILLIAM S. LAWSON, *Primary Examiner.*

U.S. Cl. X.R.

83—647.5, 701